United States Patent [19]

Barclay

[11] Patent Number: 5,798,765
[45] Date of Patent: Aug. 25, 1998

[54] THREE DIMENSIONAL LIGHT INTENSITY DISPLAY MAP

[75] Inventor: Bruce Alan Barclay. Gilbert, Ariz.

[73] Assignee: Motorola, Inc.. Schaumburg, Ill.

[21] Appl. No.: 907,773

[22] Filed: Aug. 8, 1997

Related U.S. Application Data

[63] Continuation of Ser. No. 590,240, Jan. 23, 1996, abandoned, which is a continuation of Ser. No. 210,483, Mar. 21, 1994, abandoned.

[51] Int. Cl.$^6$ .................................................. G06T 15/50
[52] U.S. Cl. ................................................................ 345/426
[58] Field of Search ...................... 395/119, 126, 395/131, 132; 345/419, 426, 431, 432, 136, 137, 138

[56] References Cited

U.S. PATENT DOCUMENTS

| | | | |
|---|---|---|---|
| 4,709,231 | 11/1987 | Sakaibara et al. | 395/126 |
| 4,729,127 | 3/1988 | Chan et al. | 382/56 |
| 4,930,092 | 5/1990 | Reilly | 395/123 |
| 4,970,682 | 11/1990 | Beckwith, Jr. et al. | 395/425 |
| 5,140,532 | 8/1992 | Beckwith, Jr. et al. | 395/101 |
| 5,179,638 | 1/1993 | Dawson et al. | 395/125 |
| 5,222,202 | 6/1993 | Koyamada | 395/123 |
| 5,253,339 | 10/1993 | Wells et al. | 395/126 |
| 5,268,995 | 12/1993 | Diefendorff et al. | 395/122 |
| 5,283,858 | 2/1994 | Moellering et al. | 395/126 |

OTHER PUBLICATIONS

Levoy, Marc: Display of Surfaces from Volume Data; 1988; pp. 29–37.

Pommert et al.; Surface Shading in Tomographic Volume Visualization: A Comparative Study; 1990; pp. 19–26.

Dozier et al.; Rapid Calculation of Terrain Parameters for Radiation Modeling from Digital Elevation Data; 1990; pp. 963–969.

*Primary Examiner*—Mark K. Zimmerman
*Attorney, Agent, or Firm*—Frank J. Bogacz

[57] ABSTRACT

A method for displaying terrain features of a topological map incudes the determination of resultant slopes between data points comprising the map. The slopes are represented by different levels of pixel intensity which are displayed upon a raster scan projection device. In an alternate embodiment of the invention, a point source of light is used to illuminate the topological surface. Normals to the surface are determined which indicate how much light would be reflected by the point light source. The amount of light reflected is then determined for each of the points of the map. The different light intensities are graded into various shades or intensities of light and displayed upon a raster display device.

4 Claims, 4 Drawing Sheets

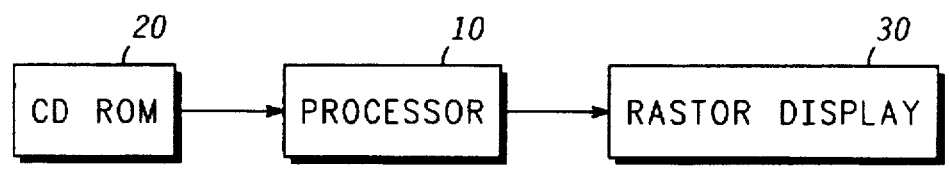
FIG. 1
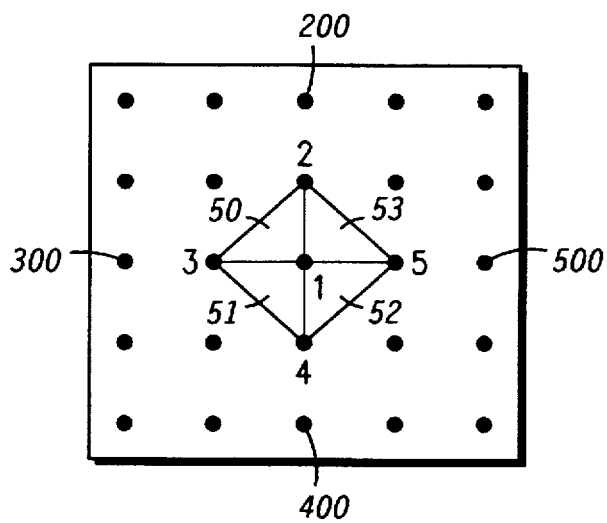
FIG. 2
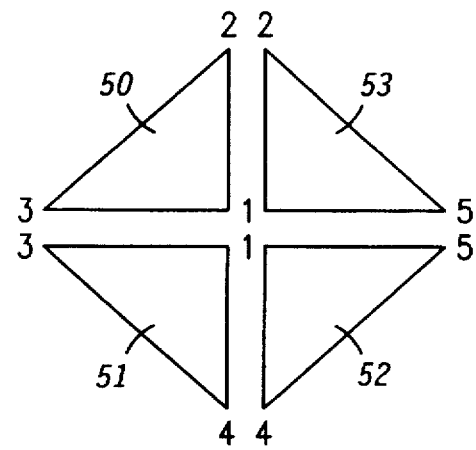
FIG. 3
FIG. 4
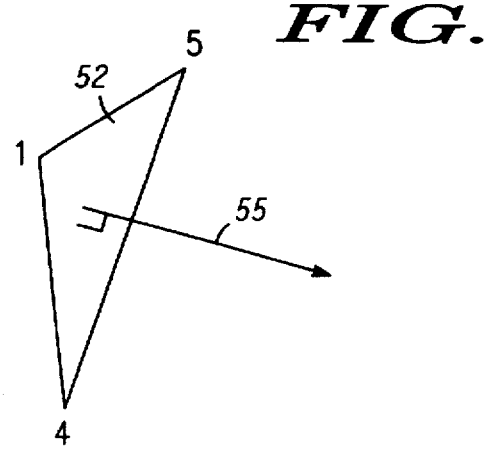

THREE DIMENSIONAL LIGHT INTENSITY DISPLAY MAP

This application is a continuation-in-part of prior application Ser. No. 08/590,240, filed Jan. 23, 1996 now abandoned which is a continuation of prior application Ser. No. 08/210,483, filed Mar. 21, 1994 now abandoned.

The U.S. Government has a paid-up license in this invention and the right in limited circumstances to require he patent owner to license others on reasonable terms as provided for by the terms of contract No. DAAB07-92-C-L001 awarded by the U.S. Army.

BACKGROUND OF THE INVENTION

The present invention pertains to graphical displays of terrain and more particularly to graphical display of digital elevation data.

Printed maps typically show topological features. Such prior art systems are contour lines to show elevation. Each contour line shows a different elevation group. Each group contains a range of elevations. This shows only elevation areas. It does not show slope or the detail of the terrain. It also doesn't allow for adding multiple maps because the contours are relative to each individual map. What is needed is a picture that shows the terrain, as a bird sees it, but doesn't distort the image in any way.

One system that would use this map display is the JSTARS (Joint Surveillance Target Attack Radar System). This system gathers moving targets from a radar source and displays them on a map background. The map needs to be meaningful and accurate. Currently, the JSTARS does not provide elevation data. This would help plan battlefield operations by knowing slope and mountain areas.

BRIEF DESCRIPTION OF THE DRAWINGS

FIG. 1 is a block diagram of a processor and display arrangement for producing maps in accordance with the present invention.

FIG. 2 is a layout of a grid of elevation points associated with a map in accordance with the present invention.

FIG. 3 is a layout depicting the processing by the method of elevation points in accordance with the present invention.

FIG. 4 depicts processing for finding normals to triangles of elevation points in accordance with the present invention.

DESCRIPTION OF THE PREFERRED EMBODIMENT

Figure 5:
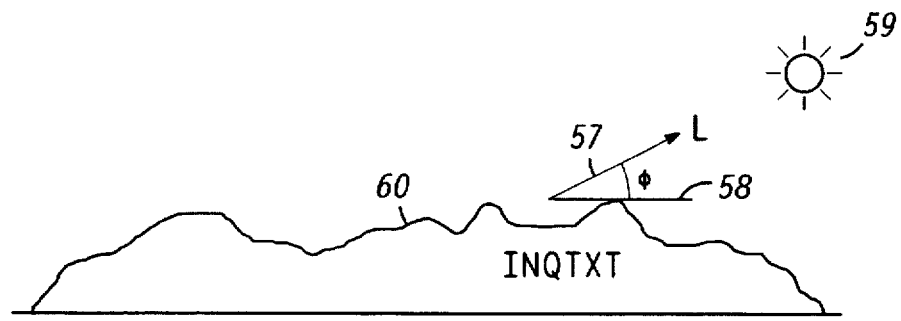
FIG. 5 is a view of terrain depicting a vector light source in accordance with the present invention.

The present invention shows two methods that go beyond the contour display. The first method shows slope information in a graphical way while the second uses light to give a three-dimensional view of the terrain.

FIG. 1 illustrates a block diagram of a map display arrangement for digitized map display of elevation data in accordance with a preferred embodiment of the invention. The elevation data in this application uses Digital Terrain Elevation Data (DTED) as the source material. This DTED comes on CD-ROM from the Defense Mapping Agency (DMA). The DTED data is read from CD-ROM 20 by processor 10. Processor 10 processes the data and when it is complete, the data is sent to raster display 30. For this invention, processor 10 was a Sun Sparc board running SunOS. Raster display 30 can be any raster display that can display 16 or more scales of gray.

Processor 10 is coupled to CD-ROM 20 and to raster display 30.

Slope Method

The slope method takes elevation data of any given area and produces 16 shades of gray. The brightest intensity being a steep slope and the darkest intensity being flat. With this method, the direction of the slope is not important. This will aid in knowing if a vehicle can traverse a given terrain.

This invention will use up to 5 elevation points to calculate the slope for one point. These 5 points (1–5) are shown in FIG. 2. The point that is calculated is for point 1. Each of these lines connecting the points has a slope. The absolute slope for each of the four lines is calculated. The slopes are added together and divided by four to get the average slope at point 1. This requires extra slope calculations but give a more accurate slope of the point in question. The final slope will be between 0 and 90 degrees. To save on memory, each point is stored as on nibble (4 bits). This give a value of 0–15. Initially the slope that was calculated was scaled down to equal chunks. The calculated slope is then divided by 5.625 (90 degrees/16=5.625). This was not done because there is hardly ever a time where the slope is greater than 45 degrees between two points. Instead, a exponential type value is used.

TABLE 1

Color Look Up Table for Slope Display

| Slope (x) | Index | RED | GREEN | BLUE |
|---|---|---|---|---|
| 0 ≦ x < 1 | 0 | 15 | 15 | 15 |
| 1 ≦ x < 2 | 1 | 30 | 30 | 30 |
| 2 ≦ x < 4 | 2 | 45 | 45 | 45 |
| 4 ≦ x < 7 | 3 | 60 | 60 | 60 |
| 7 ≦ x < 10 | 4 | 75 | 75 | 75 |
| 10 ≦ x < 13 | 5 | 90 | 90 | 90 |
| 13 ≦ x < 16 | 6 | 105 | 105 | 105 |
| 16 ≦ x < 19 | 7 | 120 | 120 | 120 |
| 19 ≦ x < 22 | 8 | 135 | 135 | 135 |
| 22 ≦ x < 25 | 9 | 150 | 150 | 150 |
| 25 ≦ x < 28 | 10 | 165 | 165 | 165 |
| 28 ≦ x < 31 | 11 | 180 | 180 | 180 |
| 31 ≦ x < 34 | 12 | 195 | 195 | 195 |
| 34 ≦ x < 37 | 13 | 210 | 210 | 210 |
| 37 ≦ x < 45 | 14 | 225 | 225 | 225 |
| 45 ≦ x | 15 | 240 | 240 | 240 |

Table 1 divides the values more fairly and gives a better contrast of the data. Lower slopes are more common so this gives better resolution for common slopes.

If there was a vehicle that could not go over 16 degrees, then the color look up table could change. Every entry above index 7 could be a bright red color. At this point, the map would display slopes above 16 degrees in red and all other slopes gray. This would indicate to the operator at the display where the vehicle could traverse.

Flow Chart of Slope Map

Figure 10:
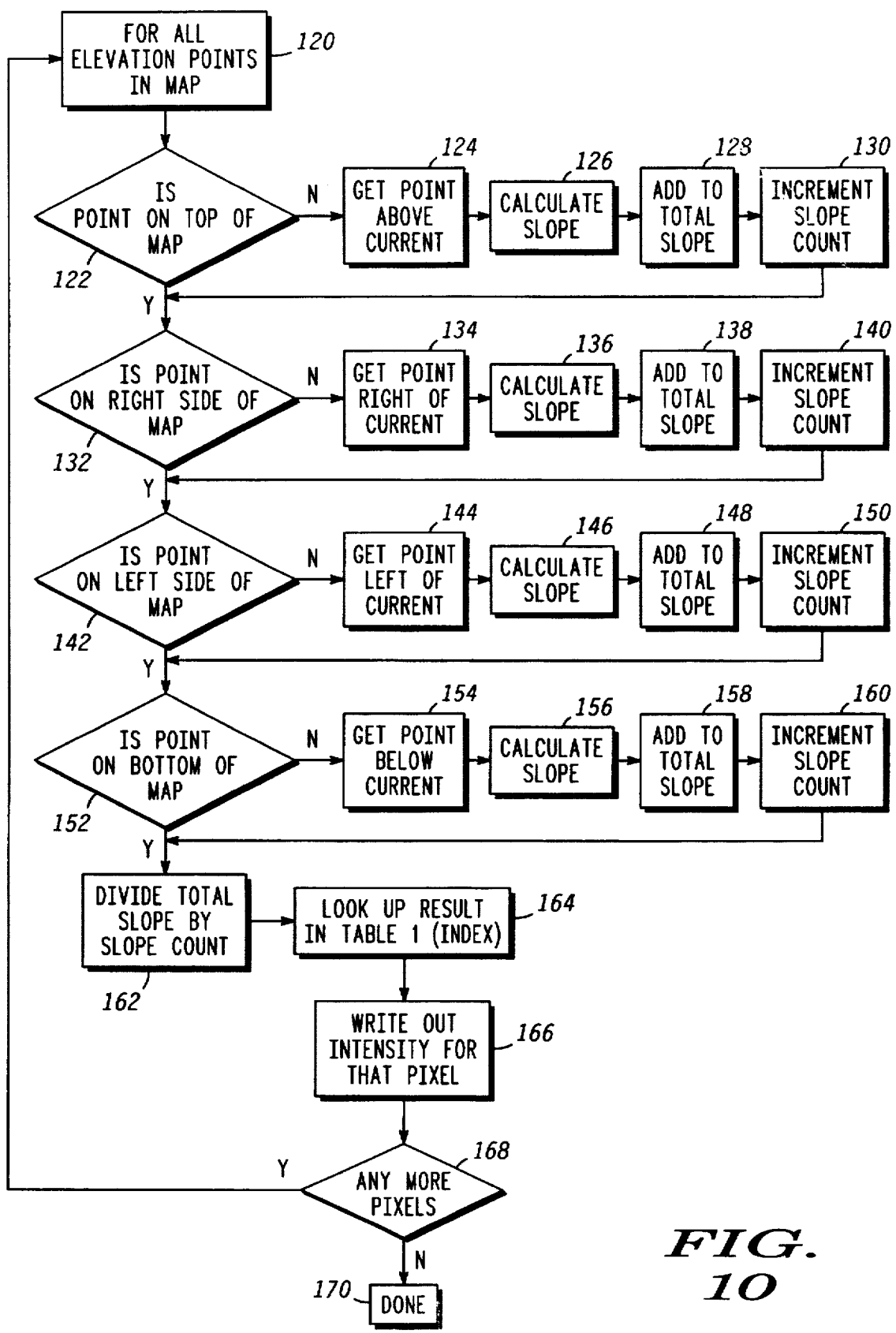
FIG. 10 is a flow chart of a method for producing slope intensity maps in accordance with the present invention.

FIG. 10 is a flow chart of the process to create the slope map. Processor 10 is reading the digital data from CD-ROM 20. This flow is done in processor 10. Processor 10 reads the data from CD-ROM 20, block 120. This will continue for each data point in the map. Once it gets the elevation point, it checks to see if the elevation point is on the top row of the map, block 122. If the elevation point is at the top row, point 200 as in FIG. 2, data can not be retrieved from CD-ROM 20 and control takes the Y path to block 132. If the elevation point is not at the top row (point 1), it takes the N path to block 124. If the elevation point is not at the top row (N path, point 1), then the elevation point 1 above the current elevation point is read from CD-ROM 20, block 124. The slope is calculated for the above point 1, block 126. This calculated slope is added to the total slope value, block 128. The slope counter is bumped (incremented) up by one, block 130. Block 128 and block 130 are used to calculate the final slope at the end of the flow chart.

At this point, control drops through to check to see if the current elevation point is on the right side of the map, block 132. If the present elevation point is at the right column, point 500 in FIG. 2 can not be retrieved, control takes the Y path to block 142. If the point is not at the right column (point 1), control takes the N path to block 134. If the elevation point is not at the right column (N path), then the elevation point 5 to the right of the current elevation point is read from CD-ROM 20, block 134. The slope is calculated for the right point, block 136. This calculated slope is then added to the total slope value, block 138. The slope counter is bumped up by one, block 140.

At this point, control drops through to check to see if the current elevation point is on the left side of the map, block 142. If it at the left column, point 300 in FIG. 2 can not be retrieved, control takes the Y path to block 152. If the point is not at the left column point 1, control takes the N path to block 144. If the elevation point 1 is not at the left column (N path), then the elevation point 3 to the left of the current elevation point is read from CD-ROM 20 by processor 10, block 144. The slope is calculated for the left point 3, block 146. This calculated slope is then added to the total slope value, block 148. The slope counter is bumped up by one, block 150.

At this point, control drops through to check to see if the current elevation point is on the bottom row of the map, block 152. If the elevation point is at the bottom row, point 400 in FIG. 2 can not be retrieved, control takes the Y path to block 162. If the point is not at the bottom row, control takes the N path to block 154. If the elevation point is not at the bottom row (N path), then the elevation point 4 below the current elevation point is read from CD-ROM 20, block 154. The slope is calculated for the bottom point, block 156. This calculated slope is then added to the total slope value, block 158. The slope counter is bumped up by one, block 160. At this point, there are either 2 or 4 points that are received depending on where the point was on the map. These slopes have been calculated and added together. The final slope is then divided by the number of points retrieved, block 162. This value is between 0 and 90 degrees. Look this value up in table 1 to get an index between 0 and 15, block 164. Use the look up table to write out the intensity for that pixel, block 166. A check is made to see if there are any more points to process, block 168. If there are, processor 10 takes the Y path to block 120. If not, the process is complete, block 170.

Lighting Method

The lighting method takes the elevation data of any given area and produces 16 shades of gray. It does this by putting a light source at 25 degrees to the terrain. If the angle between the light source and the normal vector to the terrain is small, then the pixel intensity is bright. If the angle is large, the pixel intensity is dark. This method goes beyond just slope. This method calculates the normal to the terrain and then shines a light source on the terrain. This gives the illusion of a three-dimensional map. This map gives the operator of the system viewing the map a realistic view of the terrain he/she is traversing. This also is an accurate map. There is no distortion with this map unlike a photograph taken from the air.

Like the slope map, the lighting map can take up to 5 points to calculate the intensity of one pixel. The difference is that instead of using slopes, it uses normals to triangles. FIG. 2 shows a typical way the triangles are formed. In FIG. 3, the triangles shown are 50, 51, 52, and 53. Triangles are used instead of rectangles because they are guaranteed to be planar. Rectangles are not guaranteed to be planar. In FIG. 2 and FIG. 3, the point that is being calculated is point 1. The normal is calculated for each of the triangles (50–53).

FIG. 4 shows an example of one of the 4 triangles. This happens to be triangle 52. The normal to triangle 52 is vector 55. The normal is calculated by taking the cross product of two vectors that make up the triangle. It is very important that the vectors are taken consistently in a counter-clockwise direction so that the normal is not inverted. This is done for all 4 triangle (50, 51, 52, and 53). All four normals are then added together to get a final normal. For simplicity, this final normal is assumed to be vector 55.

In FIG. 5, a light vector (57) is chosen to illuminate the terrain (60). This light vector must point towards the light source (59). The angle between this light vector and the level earth (58) is $\emptyset$. A good value for $\emptyset$ is 25 degrees. This gives a good picture with contrast. A $\emptyset$ that is too large, washes out the picture. A $\emptyset$ that is too small gives too many shadows. The angle ($\emptyset$) of the light vector (57) is constant over all the terrain.

Figure 6:
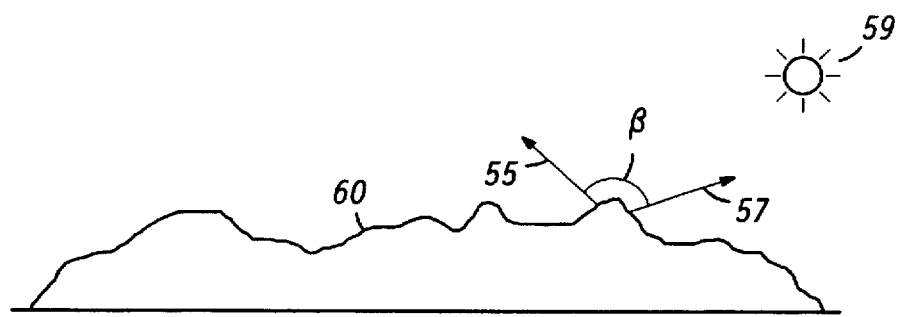
FIG. 6 is a view of terrain with a light source not hitting the terrain (shadow).
Figure 7:
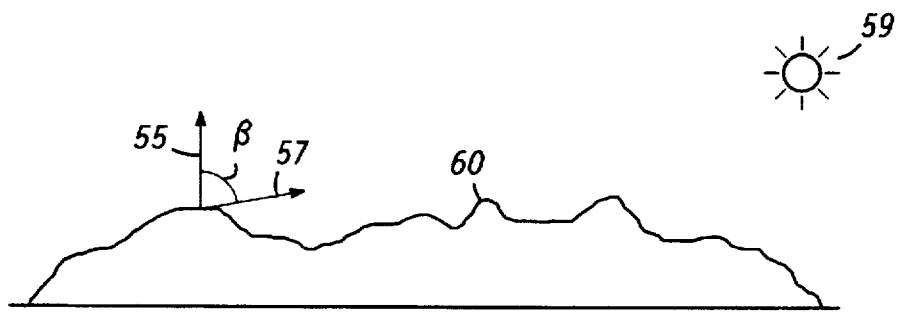
FIG. 7 is a view of terrain with a light source hitting the terrain with most light bouncing off.
Figure 8:
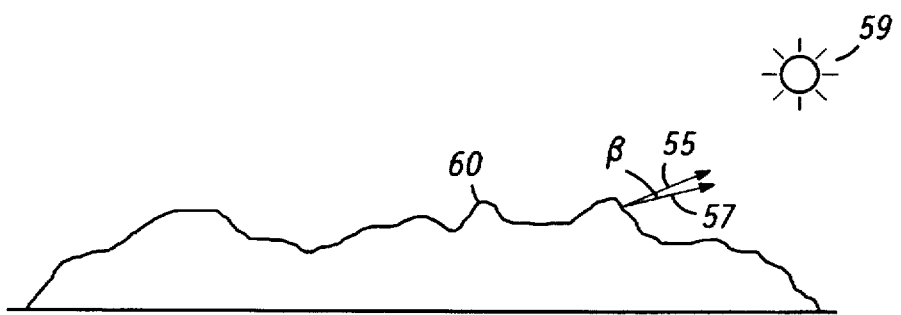
FIG. 8 is a view of terrain with a light source hitting the terrain with most light being absorbed.

The next step is to determine the angle $\beta$ between the light source and the normal to the selected elevation point. To get this angle, the dot product is performed on vector 55 and vector 57. The order is not important. The dot product is the cosine of the angle between the two vectors. The dot product is used for performance reasons. This will give a result between −1 and 1. If this value is a negative number (FIG. 6), then the light vector (57) does not even hit the terrain because the angle is greater than 90 degrees. Any point in the shadow is colored at the lowest intensity to show a shadow affect. If the angle is between 0 and 1, the light source does shine on the terrain. If the result is close to zero (Large angle between vector 57 and vector 55), the pixel intensity is dark (FIG. 7). The closer the result is to 1 and the smaller the angle between vectors 55 and 57, the brighter the pixel intensity (FIG. 8). To save on memory, 4-bit data is used. This gives 16 different shades of gray. Since the angle between vector 57 and vector 55 can be anything, the delta for the intensities is constant. See table 2 for the color look up table.

TABLE 2

Color Look Up Table for Light Display

| INDEX | COS β (x) | RED | GREEN | BLUE |
|---|---|---|---|---|
| 0 (Shadow) | Negative | 15 | 15 | 15 |
| 1 | >.066 | 30 | 30 | 30 |
| 2 | .066 < x < .133 | 45 | 45 | 45 |
| 3 | .133 < x < .2 | 60 | 60 | 60 |
| 4 | .2 < x < .266 | 75 | 75 | 75 |
| 5 | .266 < x < .333 | 90 | 90 | 90 |
| 6 | .333 < x < .4 | 105 | 105 | 105 |
| 7 | .4 < x < .466 | 120 | 120 | 120 |
| 8 | .466 < x < .533 | 135 | 135 | 135 |
| 9 | .533 < x < .6 | 150 | 150 | 150 |
| 10 | .6 < x < .666 | 165 | 165 | 165 |
| 11 | .666 < x < .733 | 180 | 180 | 180 |
| 12 | .733 < x < .8 | 195 | 195 | 195 |
| 13 | .8 < x < .866 | 210 | 210 | 210 |
| 14 | .866 < x < .933 | 225 | 225 | 225 |
| 15 | .933 < x < 1.0 | 240 | 240 | 240 |

The pixel intensity is brighter when the angle is smaller because the reflected light is more concentrated. The light does not bounce off as much. The light is absorbed into the terrain.

Flow Chart of Light Map

Figure 9:
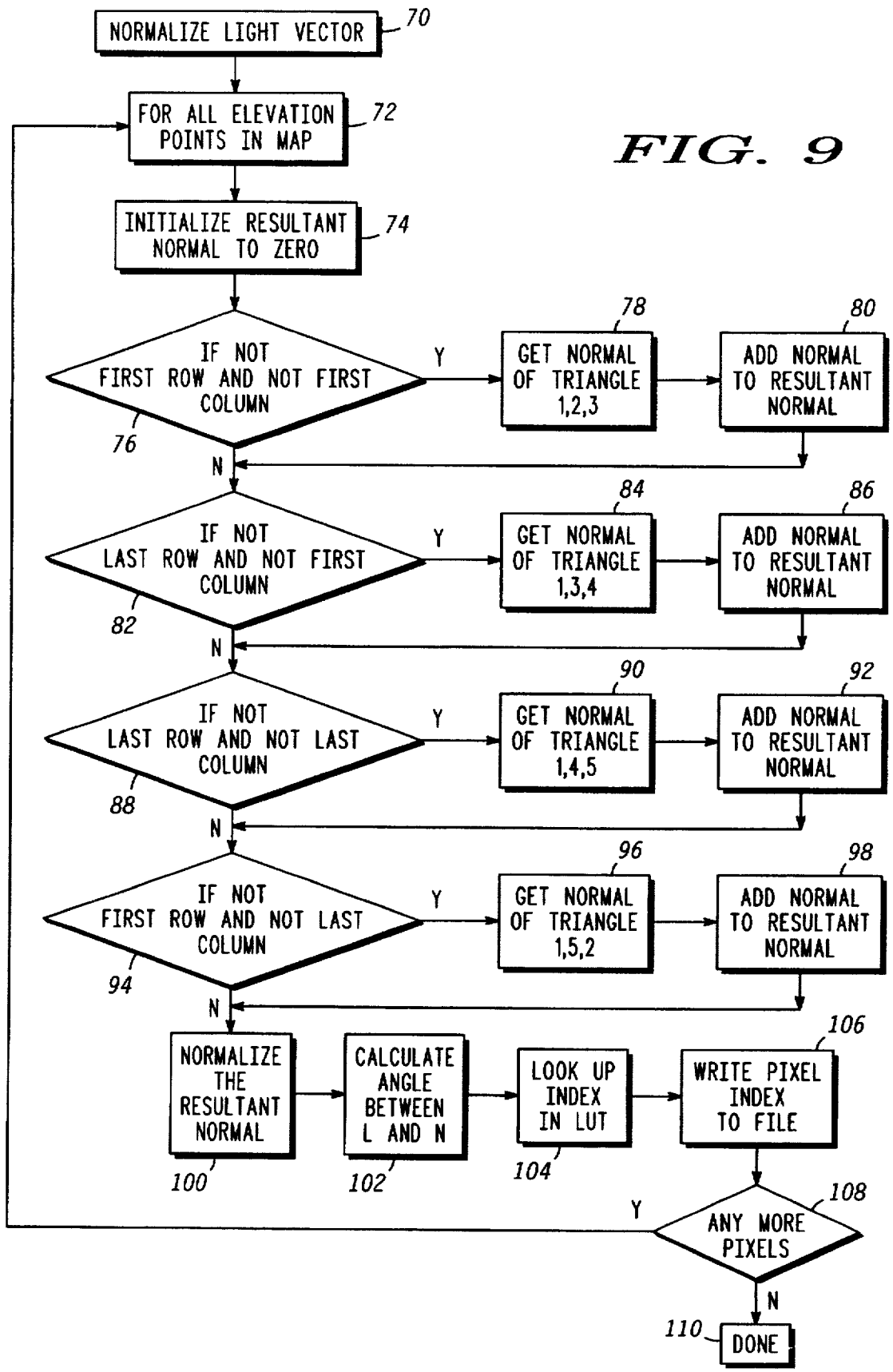
FIG. 9 is a flow chart of a light intensity method of producing maps in accordance with the present invention.

FIG. 9 is a flow chart of the process to create the light map. Processor 10 is reading the digital data from CD-ROM 20. This flow is done in processor 10. A light vector (57) needs to be chosen and then normalized, block 70. Processor 10 reads the data from CD-ROM 20, block 72. This will continue for each data point in the map. Since there is going to be up to four normals (one for each triangle), a resultant normal is initialized to zero, block 74.

Once it gets the elevation point, the method checks to see if the elevation point is not in the first row of the map and not the first column as previously discussed, block 76. If the point is at the top or left side, take the N path to block 82. If it is not in the first row of the map and not in the first column of the map, there is data for triangle 50 and the Y path is taken to block 78. Get any two vectors of the triangle by subtracting one point from the other point. This must be done consistently so the vectors point in the correct direction (out). These vectors are then normalized. From here, the cross product is performed on the two vectors in a counter-clockwise manner. This will give the normal to a first triangle, block 78. Add the calculated normal to the final resultant normal, block 80. This resultant normal will be a combination of all other normals. Then the method proceeds to block 82.

Then the method checks to see if the elevation point is not in the last row of the map and not on the first column, block 82. If it is at the bottom or left side, take the N path to block 88. If it is not in the last row of the map and not in the first column of the map, there is data for triangle 51 and the Y path is taken to block 84. Get any two vectors of the triangle by subtracting one point from the other point. This must be done consistently so the vectors point in the correct direction (out). These vectors are then normalized. From here, the cross product is done on the two vectors in a counter-clockwise manner. This will give the normal to a second triangle, block 84. Add the calculated normal to the final resultant normal, block 86. This then drops down to block 88.

Then the method checks to see if the elevation point is not in the last row of the map and not on the right most column, block 88. If it is at the bottom or right side, take the N path to block 94. If it is not in the last row of the map and not in the last column of the map, there is data for triangle 52 and the Y path is taken to block 90. Get any two vectors of the triangle by subtracting one point from the other point. This must be done consistently so the vectors point in the correct direction (out). These vectors are then normalized. From here, the cross product is done on the two vectors in a counter-clockwise manner. This will give the normal to a third triangle, block 90. Add the calculated normal to the final resultant normal, block 92. Then the method proceeds to block 94.

Then check to see if the elevation point is not in the first row of the map and not on the last column, block 94. If it is at the top or right side, take the N path to block 100. If it is not in the first row of the map and not in the last column of the map, there is data for triangle 53 and the Y path is taken to block 96. Get any two vectors of the triangle by subtracting one point from the other point. This must be done consistently so the vectors point in the correct direction (out). These vectors are then normalized. From here, the cross product is done on the two vectors in a counter-clockwise manner. This will give the normal to a fourth triangle, block 96. Add the calculated normal to the final resultant normal, block 98. This then drops down to block 100.

In order to do valid vector addition, normalize the resultant normal vector, block 100. This is the final normal vector to the terrain in question. Calculate the angle between the resultant normal (55) and the light vector (57) by using the dot product, block 102. This will give a value between −1 and 1. Look up the value in table 2 to get the 4-bit index and the color associated with the pixel, block 104. Display this pixel to raster display 30, block 106. If there is no more data to process, block 108, take the N path and exit, block 110. If there is more data to process, take the Y path and go to block 72.

As a result, this method produces three dimensional maps of terrain on two dimensional displays. These maps provide accurate views of terrain obtained from three dimensional data commercially available on compact disk (CD). With such maps, an observer is able to see terrain details without the typical distortion of a photograph. In addition, a topological map with many contour lines which are difficult to read may be eliminated.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A display method for displaying digitized data representing a three dimensional topological with slope intensity map, said display method comprising the steps of:

providing a map of topological features described by three dimensional information for a plurality of points on the slope intensity map;

grouping a maximum number of line segments from a select point to adjacent points on the slope intensity map;

determining a resultant slope for the maximum number of line segments;

dividing a sum of slopes by the slope count to produce the resultant slope;

determining a pixel intensity from a table which relates slope to the pixel intensity;

displaying on a rastor display the pixel with the pixel intensity exponentially related to the resultant slope;

said step of grouping includes the step of determining whether the selected point is on a top edge of the slope intensity map;

if the selected point is not on a top edge of the map, said step of determining a resultant slope includes the steps of:
  obtaining the elevation data for a first point above the selected point;
  calculating the slope of a line segment between the selected point and the first point;
  adding the calculated slope between the first point and the selected point to the resultant slope produce the sum of slopes;
  incrementing the slope count;

said step of grouping includes the step of determining whether the selected point is on a right edge of the slope intensity map;

if the selected point is not on the right edge of the map, said step of determining a resultant slope includes the steps of:
  obtaining elevation data for a second point to the right of the selected point;
  calculating the slope of a line segment from the second point to the selected point;
  adding the calculated slope between the second point and the selected point to the resultant slope produce the sum of slopes;
  incrementing the slope count;

said step of grouping includes the step of determining whether the selected point is on a left edge of the slope intensity map;

if the selected point is not on a left edge of the map, said step of determining a resultant slope includes the steps of:
  obtaining elevation data for a third point of the map to the left of the selected point;
  calculating the slope of a line segment between the selected point and the third point;
  adding the calculated slope between the third point and the selected point to the resultant slope produce the sum of slopes;
  incrementing the slope count;

said step of grouping includes the step of determining whether the selected point is on a bottom edge of the slope intensity map;

if the selected point is not on a bottom edge of the map, said step of determining a resultant slope includes the steps of:
  obtaining elevation data for a fourth point of the map below the selected point;
  calculating the slope of a line segment between the selected point and the fourth point;
  adding the calculated slope between the fourth point and the selected point to the resultant slope produce the sum of slopes; and
  incrementing the slope count.

2. The display method for displaying with slope intensity digitized data as claimed in claim 1, wherein there is further included the step of dividing the resultant slope by the slope count.

3. The display method for displaying with slope intensity digitized data as claimed in claim 2, wherein there is further included the step of writing an intensity proportional to the determined index by a processor to the raster display.

4. The display method for displaying with slope intensity digitized data as claimed in claim 3, wherein there is further included the steps of:

determining whether any other points of the plurality of points are to be displayed;

iterating all previous steps if other points of the plurality of points are to be displayed; and if no other points of the plurality of points are to be displayed, completing said display method.

* * * * *